(12) United States Patent
Nakamura

(10) Patent No.: US 6,849,820 B2
(45) Date of Patent: Feb. 1, 2005

(54) PRELIMINARY ASSEMBLY SYSTEM AND ASSEMBLY METHOD FOR VEHICLE BODY COMPONENT PARTS

(75) Inventor: Setsuo Nakamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/230,135

(22) Filed: Aug. 29, 2002

(65) Prior Publication Data

US 2003/0057255 A1 Mar. 27, 2003

(30) Foreign Application Priority Data

Sep. 25, 2001 (JP) ........................................ 2001-290569

(51) Int. Cl.[7] .............................................. B23K 11/10
(52) U.S. Cl. .................... 219/117.1; 72/306; 219/78.16
(58) Field of Search .......................... 219/117.1, 86.25, 219/78.16; 72/306

(56) References Cited

U.S. PATENT DOCUMENTS 5,272,903 A   12/1993   Evans 6,314,783 B1 * 11/2001 Patrick ......................... 72/306
6,324,880 B1   12/2001   Nakamura

FOREIGN PATENT DOCUMENTS

| GB | 2 344 322 A | 6/2000 |
| JP | 6-31462 | 2/1994 |
| JP | 2000-312935 | 11/2000 |
| WO | WO 00/58041 A1 | 10/2000 |

* cited by examiner

*Primary Examiner*—Cliford C. Shaw
(74) *Attorney, Agent, or Firm*—Foley & Lardner LLP

(57) ABSTRACT

A preliminary assembly system for joining a body side panel and a floor panel of an automotive vehicle in a loose-fit hemming joint state by bending a claw piece extending from a main body of one of the panels to hold the other of the panels, prior to welding. The preliminary assembly system comprises a die to be in contact with a back-side surface of the main body of one of the panels in a region forming a loose-fit hemming joint section. Additionally, a main bending blade is provided to be movable to approach the die to bend the claw piece until the loose-fit hemming joint state is established. The main bending blade is moved to approach the die by a movement amount which is mechanically determined relative to a surface of the other of the panels during formation of the loose-fit hemming joint section.

8 Claims, 14 Drawing Sheets

PRELIMINARY ASSEMBLY SYSTEM AND ASSEMBLY METHOD FOR VEHICLE BODY COMPONENT PARTS

BACKGROUND OF THE INVENTION

This invention relates to improvements in a preliminary assembly system for a body side panel and a floor panel as component parts of an automotive vehicle body, prior to welding of the body side panel and the floor panel, and to an assembly method for the body side panel and the floor panel by using the preliminary assembly system.

Hitherto, a variety of assembly methods for a vehicle body have been proposed and put into practical use in the field of automotive vehicle industry. In any of the assembly methods, for example, a floor main (floor panel) and left-side and right-side body sides (body side panels) are usually transported in their preliminarily assembled state prior to welding of the floor main and the body sides. For this purse, it has been proposed to preliminarily fixedly secure the floor main and the body sides with any suitable means. Such a proposal may securely maintain the state of the preliminary assembly. However, for example, in case that a relative (precision) location between the floor main and the body sides is intended to be made, there is a fear that no precision location can be carried out at joint sections where joining is made between the floor main and the body sides because the joint sections are insufficient in freedom.

SUMMARY OF THE INVENTION

In order to obtain a desired freedom in the joint sections, it has been proposed that each of the joint sections take the form of a so-called hemming joint section, and further that the hemming joint section takes a so-called loose-fit hemming state or incomplete hemming state, constituting an earlier technique assembly method. However, difficulties have been encountered in the earlier technique assembly method particularly in case of employing a so-called mix-flow production method in which a plurality of kinds of vehicles are assembled in a common production line.

It is an object of the present invention to provide improved preliminary assembly system and assembly method for vehicle body component parts, by which drawbacks encountered in conventional and earlier techniques can be effectively overcome with a simple and low cost measure.

Another object of the present invention is to provide improved preliminary assembly system and assembly method for vehicle body component parts, by which a constant relative freedom can be always maintained between two panels constituting a vehicle body prior to welding the two panels, regardless of the thickness or the number of the panel(s) held in a loose-fit hemming joint section.

A further object of the present invention is to provide improved preliminary assembly system and assembly method for vehicle body component parts, by which a constant clearance can be always maintained in a loose-fit hemming joint section for joining two panels constituting a vehicle body, regardless of the thickness or the number of the panel(s) held in the loose-fit hemming joint section.

An aspect of the present invention resides in a preliminary assembly system for joining a body side panel and a floor panel as component parts of a body of an automotive vehicle in a loose-fit hemming joint state by bending a claw piece extending from a main body of one of the panels to hold the other of the panels so that the panels are joined to each other in a condition having a freedom in relative location between the panels, prior to joining of the panels under welding. The preliminary assembly system comprises a die which is to be in contact with a back-side surface of the main body of one of the panels in a region forming a loose-fit hemming joint section, the back-side surface being opposite to a front-side surface of the main body facing the other of the panels. Additionally, a main bending blade 12 is provided to be movable to approach the die to bend the claw piece of the one of the panels until the loose-fit hemming joint state is established. The main bending blade is moved to approach the die by a movement amount which is mechanically determined relative to a first surface of the other of the panels during formation of the loose-fit hemming joint section, the other of the panels being put between the main body and the claw piece of the one of the panels, the first surface facing the claw piece in a bent state.

Another aspect of the present invention resides in an assembly method for vehicle body component parts. The assembly method comprises (a) preliminarily assembling a body side panel and a floor panel as the component parts of an automotive vehicle body in a loose-fit hemming joint state by bending a claw piece extending from a main body of one of the panels to hold the other of the panels so that the panels are joined to each other in a condition having a freedom in relative location between the panels; (b) welding the body side panel and the floor panel by using a servo-type spot welding gun upon accomplishing a relative location between the body side panel and the floor panel which have been preliminarily assembled; and (c) crushing the loose-fit hemming joint section by using the servo-type spot welding gun.

A further aspect of the present invention resides in an assembly method for vehicle body component parts. The assembly method comprises: (a) preliminarily assembling a body side panel and a floor panel as the component parts of an automotive vehicle body in a loose-fit hemming joint state by bending a claw piece extending from a main body of one of the panels to hold the other of the panels so that the panels are joined to each other in a condition having a freedom in relative location between the panels, by using a preliminary assembly system including a die which is to be in contact with a back-side surface of the main body of one of the panels in a region forming a loose-fit hemming joint section, the back-side surface being opposite to a front-side surface of the main body facing the other of the panels, and a main bending blade which is movable to approach the die to bend the claw piece of the one of the panels until the loose-fit hemming joint state is established, wherein the main bending blade is moved to approach the die by a movement amount which is mechanically determined relative to a first surface of the other of the panels during formation of the loose-fit hemming joint section, the other of the panels being put between the main body and the claw piece of the one of the panels, the first surface facing the claw piece in a bent state; (b) welding the body side panel and the floor panel by using a servo-type spot welding gun upon accomplishing a relative location between the body side panel and the floor panel which have been preliminarily assembled; and (c) crushing the loose-fit hemming joint section by using the servo-type spot welding gun.

BRIEF DESCRIPTION OF THE DRAWINGS

In the drawings, like reference numerals and characters designate like parts and elements throughout all figures, in which.

DETAILED DESCRIPTION OF THE INVENTION

Figure 13:
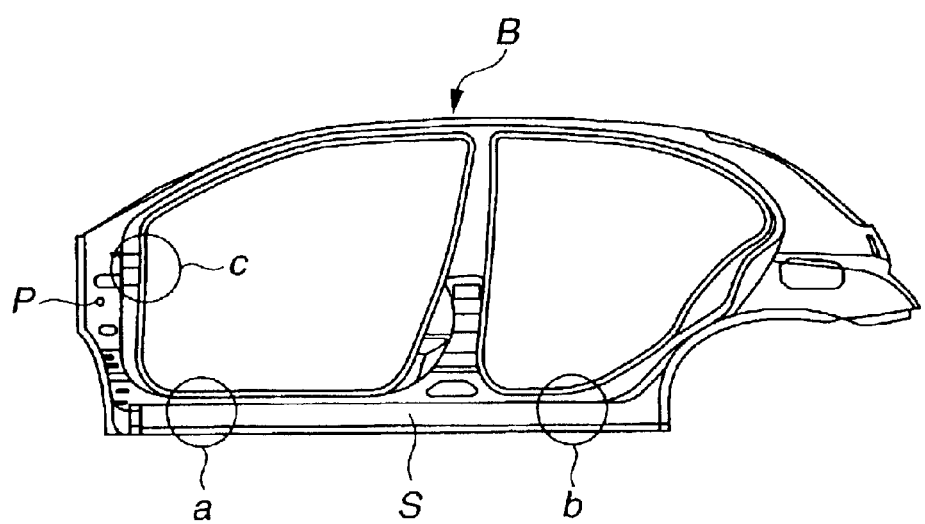
FIG. 13 is a side view of an example of a body side panel of an automotive vehicle.
Figure 14A:
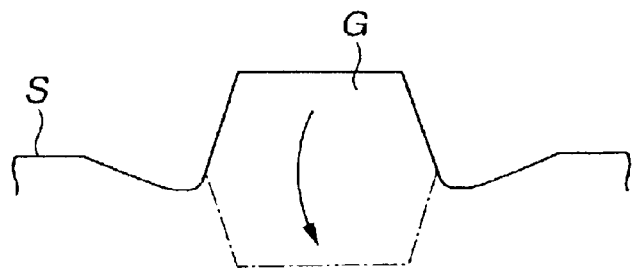
FIG. 14A is an explanatory schematic side view showing the bending state of the claw piece at a position a, b in FIG. 13.
Figure 14B:
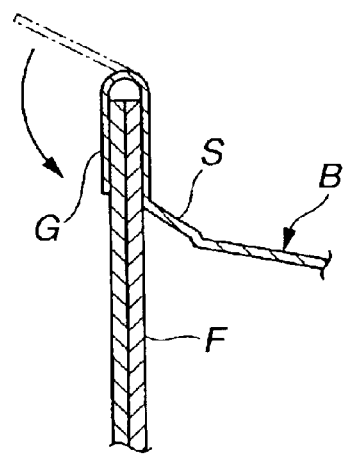
FIG. 14B is an explanatory sectional view showing the bending state of the claw piece at the position a, b in FIG. 13.

To facilitate understanding the present invention, a brief reference will be made to an earlier technique assembly method for a vehicle body of an automotive vehicle, depicted in FIGS. 12 to 16. In such an assembly method, prior to welding of a floor main (floor panel) and left-side and right-side body sides (body side panels), the floor main and the body sides are usually transported in their preliminarily assembled state. For this purpose, for example, as shown in FIGS. 13, 14A and 14B, claw pieces or portions G are previously partially formed at portions a and b of a side sill S and/or a portion c of the front pillar P in the body side panel B. This claw piece G is bent to establish a so-called hemming joint state thereby accomplishing the preliminary assembly of the body side panel B and the floor panel F. It will be understood that the structure of the portions a and b of the side sill S are shown in detail in FIGS. 14A and 14B.

In this manner of the preliminary assembly, the claw piece G is completely depressed or crushed as shown in FIG. 14B, and therefore this manner is excellent in performance of maintaining the state of the preliminary assembly. However, for example, in case that a relative precision location (relative location) between the respective panels B and F is intended to be made, there is a fear that no precision location can be carried out at the hemming joint section since the hemming joint section is insufficient in freedom.

Figure 15:
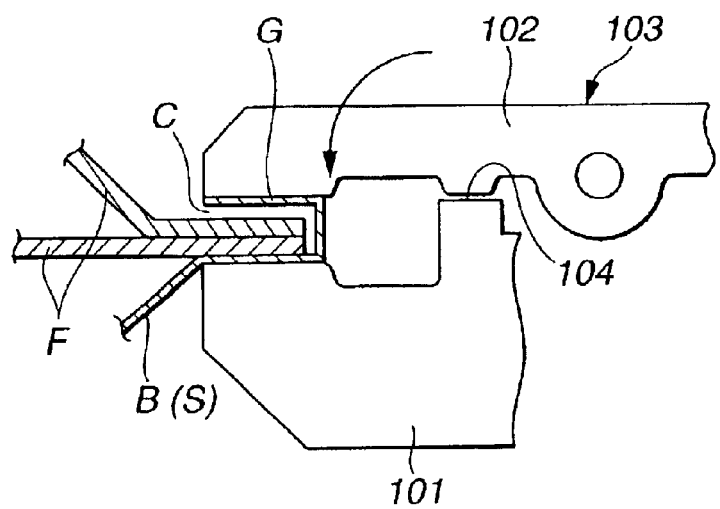
FIG. 15 is a fragmentary schematic view of an example of an earlier technique bending apparatus.

In order to obtain a desired freedom in the hemming join section, it is required to put the hemming joint section in a so-called loose-fit hemming state or incomplete hemming state. For this purpose, as shown in FIG. 15, stopper 104 is provided to bending device 103 including die 101 and swingable bending blade 102 so as to restrict a bending amount of the claw piece G, thereby maintaining a desired clearance between the body side panel B locatable at an outer-side and the floor panel F locatable at an inner-side.

Figure 16A:
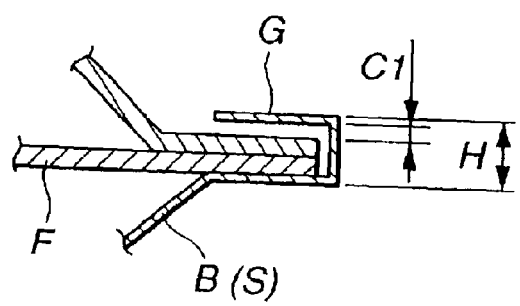
FIG. 16A is a fragmentary sectional view of a loose-fit hemming joint section formed by using the bending apparatus of FIG. 15.
Figure 16B:
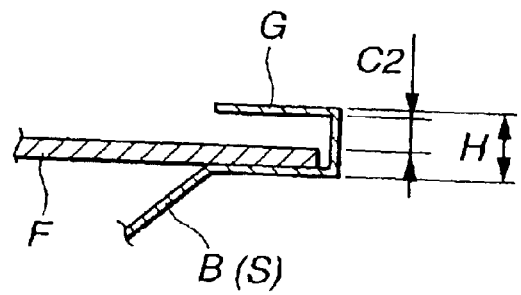
FIG. 16B is a fragmentary sectional view of another loose-fit hemming joint section formed by using the bending apparatus of FIG. 15.

However, drawbacks have been encountered in the above preliminary assembly method. That is, particularly in a so-called mix-flow production method in which a plurality of kinds of vehicles are assembled in a common production line, as shown in FIG. 16, it is usual that the thickness of the floor panel or the number of the piled floor panels F at the inner-side is different according to the kind of the vehicle or the position of the hemming joint section in the vehicle when the hemming joint section is formed in the loose-fit hemming state or incomplete hemming state. Accordingly, the size of the above-mentioned clearance C also becomes different according to the vehicle kind or the position of the hemming joint section, so that the preliminary assembly state well balanced in freedom as a whole cannot be maintained. This will cause a secondary drawback in which a specific panel unavoidably gets off during transportation of the panels in their preliminary assembly state, thereby making it impossible to attain a desired goal. For example, when comparison is made between cases of FIGS. 16A and 16B, the clearances C1 and C2 necessarily take a dimensional relationship of C1<C2 if the thickness of the floor panel F is different on the assumption that the height H of the hemming joint section is the same in the both cases.

In view of the above description of the earlier technique vehicle body assembly method, reference is now made to FIGS. 1 to 9A in which a bending apparatus for a hemming working process is illustrated as an embodiment of a preliminary assembly system according to the present invention. The preliminary assembly process is intended to bend the claw pieces G which have been previously partly formed to be bent, in the side sill S and the front pillar P of the body side panel B similarly to those in FIGS. 13 and 14 and to put the floor panel between a main body of the body side panel B and the claw pieces G of the body side panel B in a loose-fit manner, thereby forming the loose-fit hemming joint section. In this case, as shown in FIGS. 7A and 7B, even if there is a difference in thickness of the floor panel F itself or in number of the piled floor panels F when the floor panel(s) F is supported in loose-fit hemming joint section 1, a distance or clearance C1, C2 between a claw piece(G)-side surface (facing the bent claw piece) of the floor panel F and the claw piece G is constant (C1=C2) regardless of the thickness of the floor panel(s) or both in cases of FIGS. 7A and 7B, upon deciding a bending amount of each claw piece G relative to the claw piece(G)-side surface of the floor panel F. On this basis, the present invention has been made. In FIGS. 7A and 7B, the character H indicates a height of loose-fit hemming joint section 1.

Figure 7A:
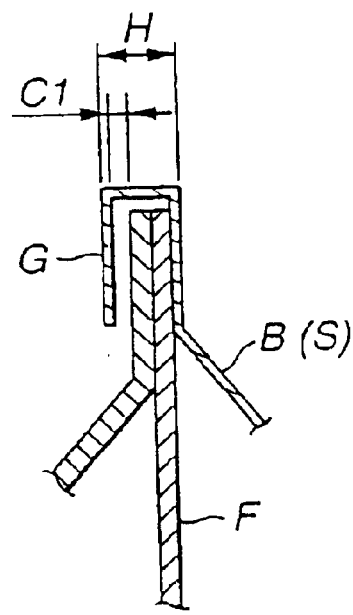
FIG. 7A is a fragmentary sectional view showing the detail of an example of a loose-fit hemming joint section after being subjected to the bending working process.
Figure 7B:
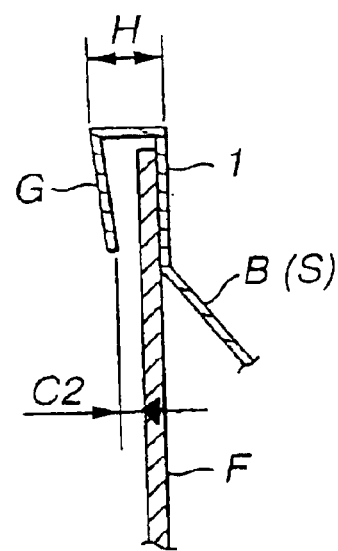
FIG. 7B is a fragmentary sectional view of the detail of another example of the loose-fit hemming joint section after being subjected to the bending working process.

More specifically, even in case that the thickness of the floor panel F is smaller in the case of FIG. 7B than in the case of FIG. 7A, the clearance C2 between the floor panel F and at least a tip end portion of the claw piece G becomes the same as that C1 in the case of FIG. 7A by forcing the claw piece toward the floor panel F in such manner that the distance between the floor panel F and the tip end portion of the claw piece G becomes equal to that in case of FIG. 7A. This makes a relative freedom between the panels B and F to be equal to that in the case of FIG. 7A.

Figure 1:
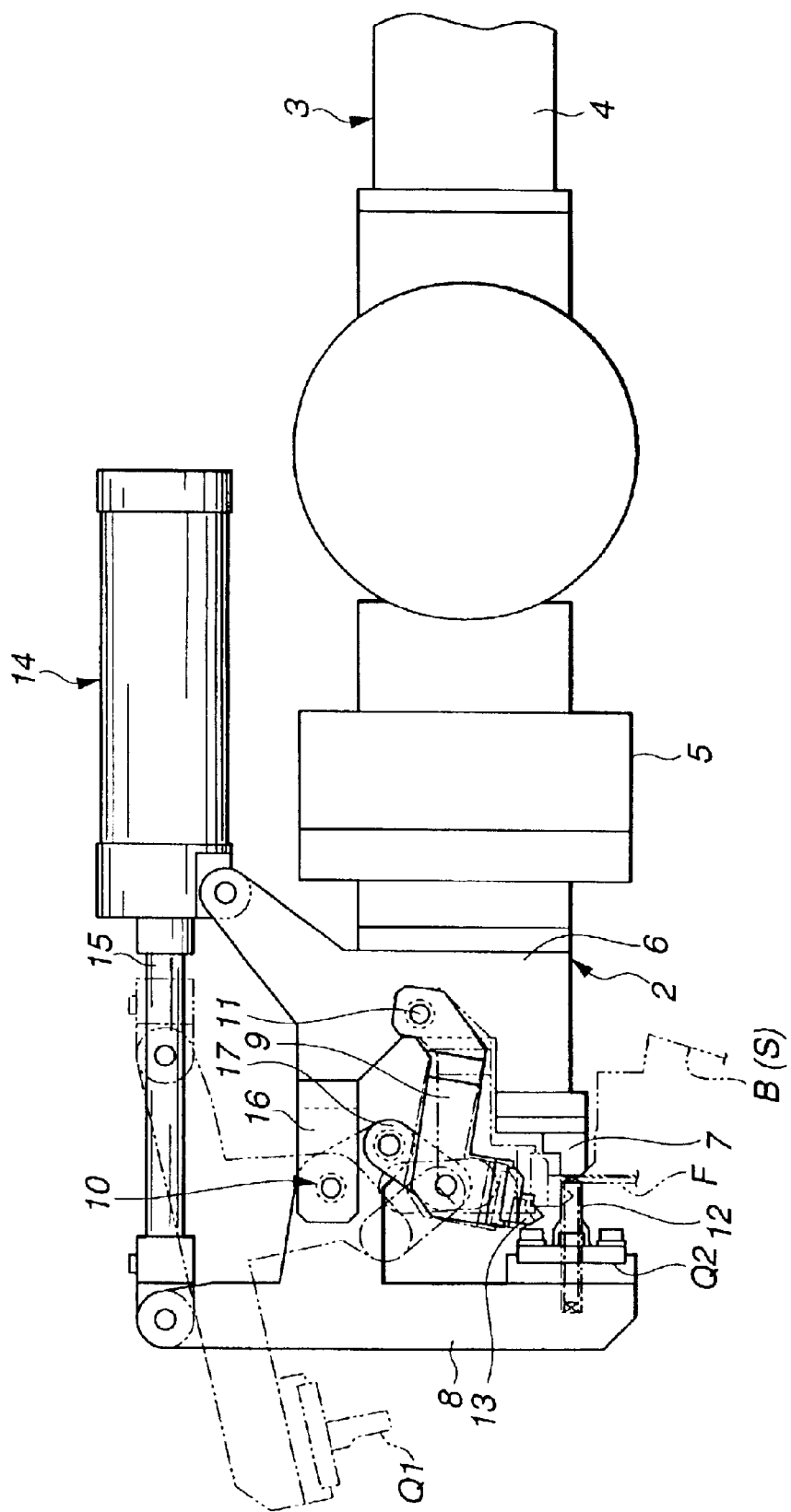
FIG. 1 is a fragmentary front view of an embodiment of a preliminary assembly system according to the present invention, serving as a bending apparatus.
Figure 2:
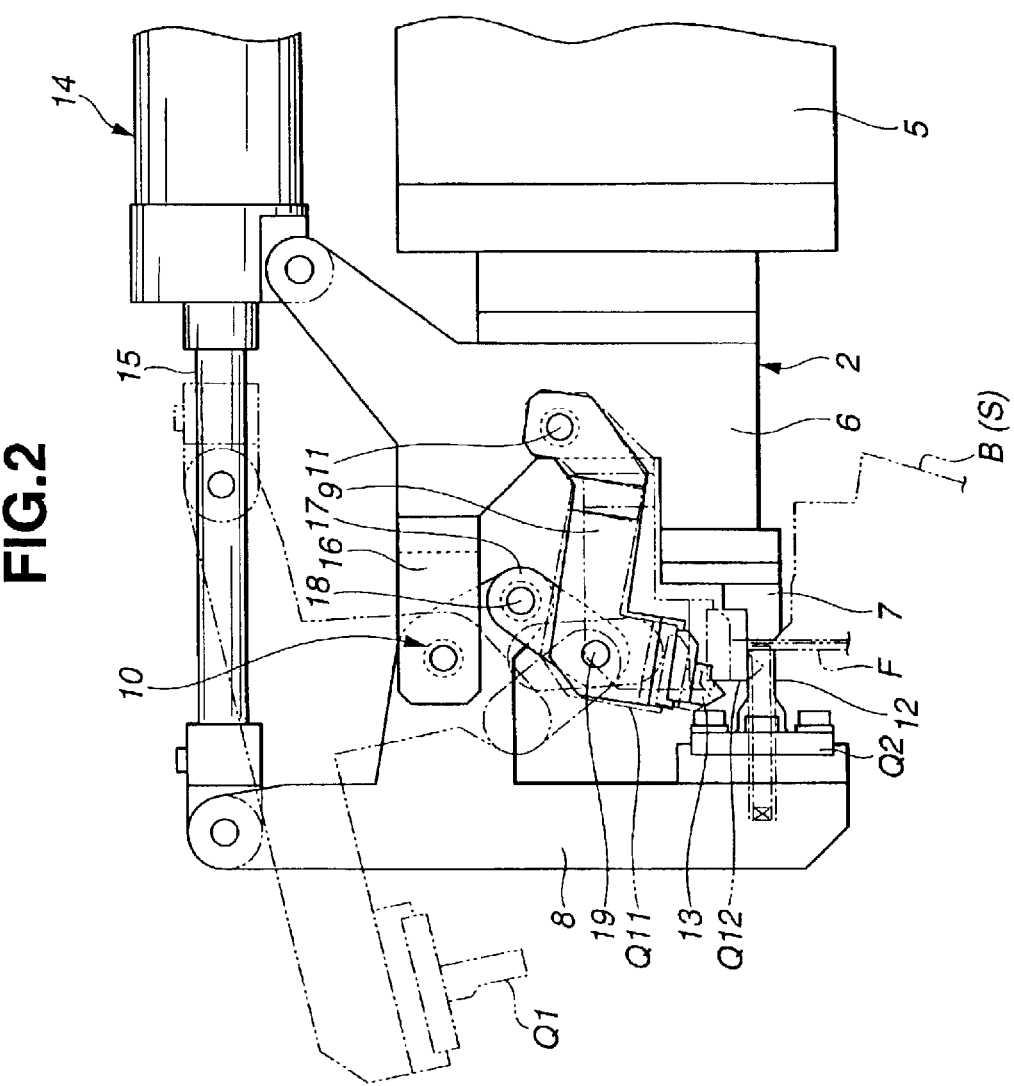
FIG. 2 is an enlarged view of an essential part of the preliminary assembly system of FIG. 1.
Figure 3:
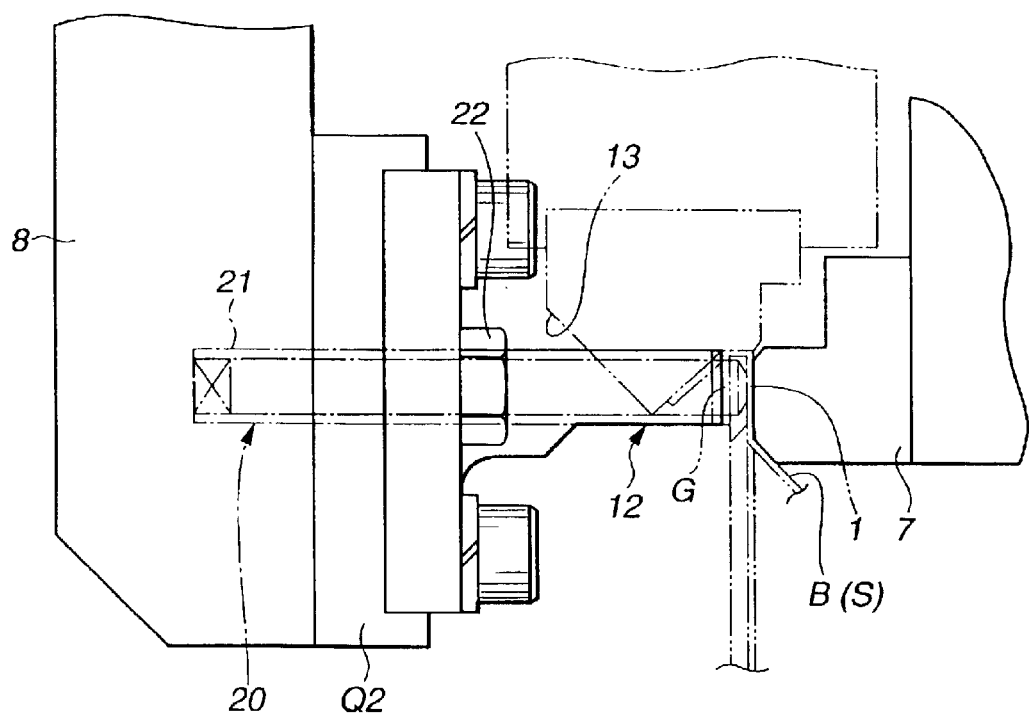
FIG. 3 is an enlarged view of an essential part of the preliminary assembly system of FIG. 2.
Figure 4:
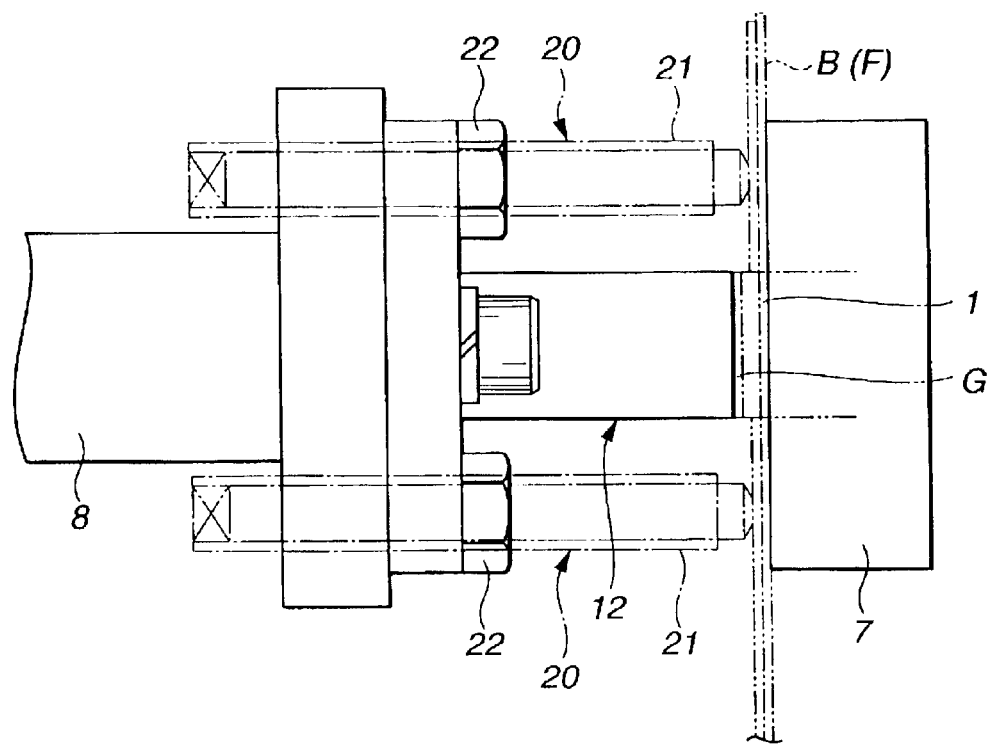
FIG. 4 is a bottom view of the part of FIG. 3.

As illustrated in FIG. 1, bending apparatus 2 is supported through a bracket 5 at a tip end section of robot arm 4 of industrial robot 3. Bending apparatus 2 includes base frame 6 which serves as a main body of bending apparatus 2 and is fixed to bracket 5. Die 7 is fixed to base frame 6 to which large and small swing arms 8, 9 are swingably supported respectively through hinge pins 10, 11. Bar-shaped main bending blade 12 is integrally fixed to the tip end section of swing arm 8, while preliminary bending blade 13 is integrally fixed to the tip end section of swing arm 9, as shown in FIGS. 2, 3 and 4.

Trunnion-type drive cylinder 14 (hydraulic or air cylinder) is swingably supported to base frame 6 so as to serve as an actuator. Drive cylinder 14 has piston rod 15 which is connected to swing arm 8 for main bending blade 12. Accordingly, swing arm 8 makes its swinging action together with main bending blade 12 around hinge pin 10 and between a main bending standby position Q1 and a main bending working position Q2, under extension and contraction actions of drive cylinder 14.

Swing arm 8 for main bending blade 12 is provided with auxiliary arm 16 to project from swing arm 8. This auxiliary arm 16 and swing arm 9 for preliminary bending blade 13 are connected to each other through link 17 and hinge pins 18, 19 so that swing arm 9 for preliminary bending blade 13 swingably moves around hinge pin 11 in relation to swing arm 8 for main bending blade 12. More specifically, in a process in which swing arm 8 for main bending blade 12 makes its swingable movement between the main bending standby position Q1 and the main bending working position Q2, swing arm 9 for preliminary bending blade 13 displaces vertically between a preliminary bending standby position Q11 and a preliminary bending working position Q12, in which the axes of three hinge pins 10, 18, 19 are brought into alignment with each other on a common straight line on a plane of FIG. 2 at an intermediate position in the stroke of the vertical displacement of swing arm 9. Preliminary bending blade 13 takes its most-descended position in the state where the axes of three hinge pins 10, 18, 19 are aligned with each other on the common straight line.

In other words, during the process in which swing arm 8 for main bending blade 12 makes its swingable movement from the main bending standby position Q1 to the main bending working position Q2 in order to accomplish the main bending working, swing arm 9 for auxiliary bending blade 13 moves from the auxiliary bending standby position Q11 to the preliminary bending working position Q12 in order to accomplish the preliminary bending in relation to the movement of swing arm 8 prior to the main bending working. Additionally, preliminary bending blade 13 is withdrawn to a position which generally corresponds to the above-mentioned preliminary bending standby position Q11, prior to reaching of main bending blade 12 to the main bending working position Q2. The above arrangement is disclosed in Japanese Patent Provisional Publication No. 2000-312935

Figure 5:
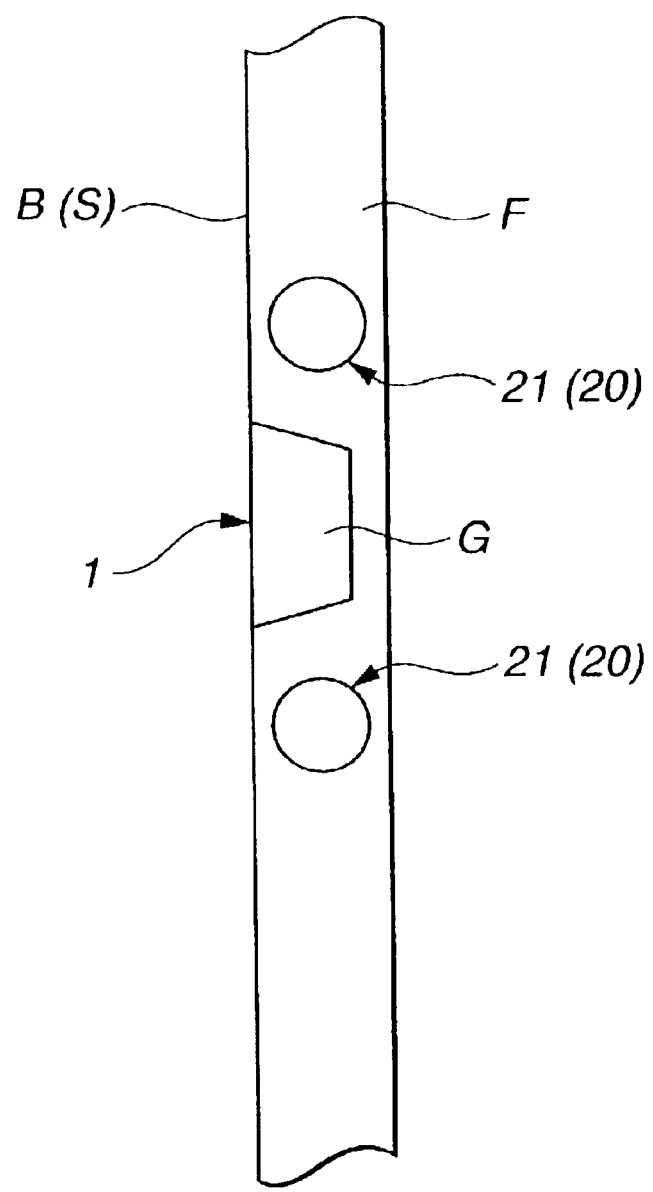
FIG. 5 is a right side view of the part of FIG. 4.

As shown in FIGS. 3 and 4, a pair of stoppers 20 are disposed at the tip end section of swing arm 8 for main bending blade 12 and located between stoppers 20. Each stopper 20 includes adjusting bolt 21 which functions as a main body of the stopper and is securely disposed through adjusting nut 22 at the tip end section of swing arm 8 in such a manner as to be adjustable in longitudinal direction. When claw piece G discussed above is bent by main bending blade 12 to form loose-fit hemming joint section 1 with claw piece G, stoppers 20 are brought into contact with the claw piece(G)-side surface of floor panel F which is to be put between the main body of the body side panel B and claw piece G forming part of the body side panel as shown in FIG. 5. As a result, the clearances C1 and C2 (discussed above with reference to FIGS. 7A and 7B) in loose-fit hemming joint section 1 are decided in accordance with a distance formed between the tip end face of main bending blade 12 and the tip end of adjusting bolt 21 which is projected from the tip end face of the main bending blade.

Figure 6A:
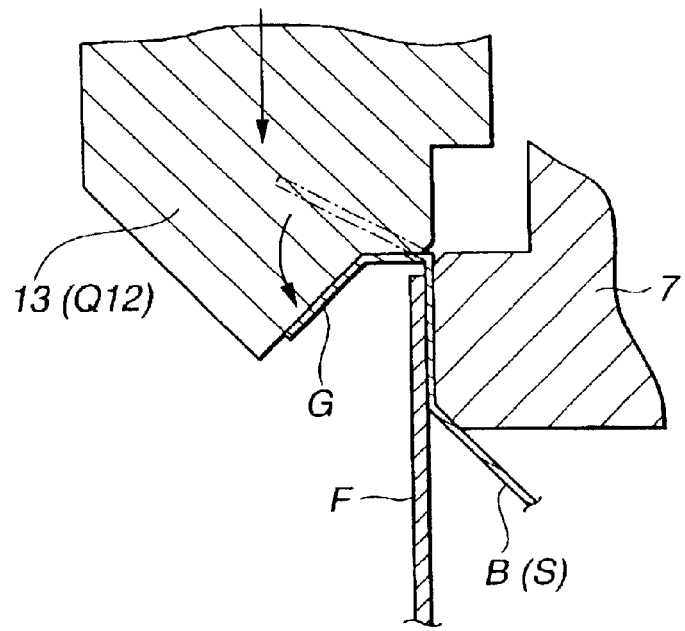
FIG. 6A is an enlarged fragmentary sectional explanatory view showing a step in a bending working process for a claw piece by the preliminary assembly system.

According to this embodiment, first a temporary location is made for the body side panel B and the floor panel F which are to be preliminarily assembled by using a jig or the like (not shown). Then, the bending working for forming loose-fit hemming joint section 1 is accomplished upon locating bending apparatus 2 at a desired bending working position under the three-dimensional operational-freedom of an industrial robot which supports the bending apparatus as shown in FIG. 1. In other words, when drive cylinder 14 is extended to make a swinging action of swing arm 8 for main bending blade 12 from the main bending standby position Q1 toward the main bending working position Q2, first preliminary bending blade 13 is descended to the preliminary bending working position Q12 as shown in FIG. 3 and FIG. 6A so that the claw piece G already bent toward the body side panel B is bent to a preliminary bending position indicated in FIG. 6.

Figure 6B:
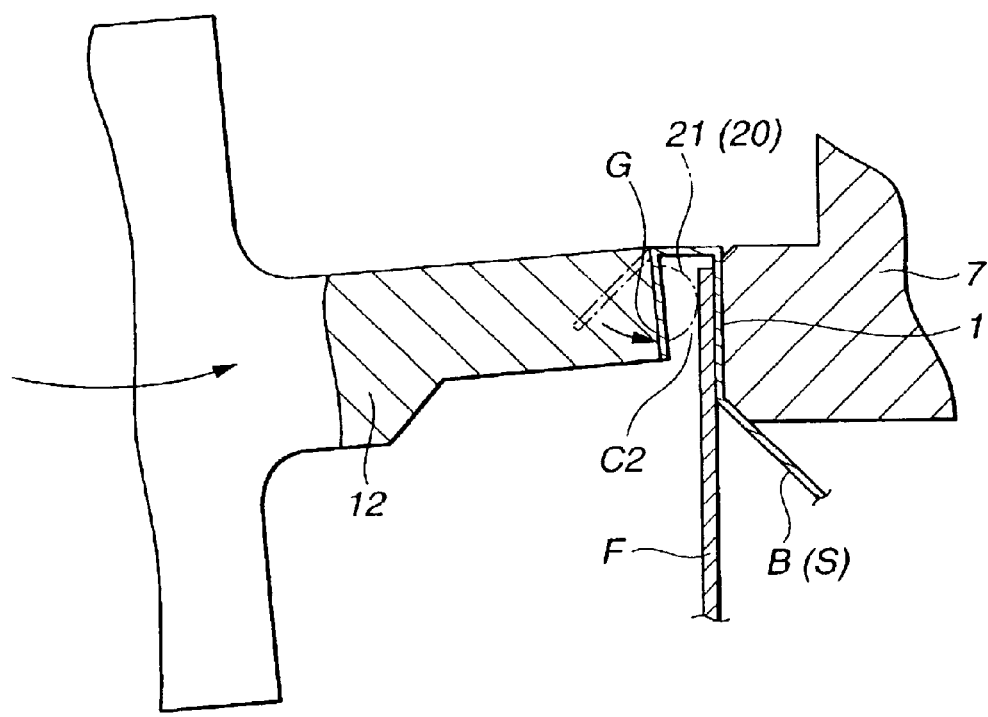
FIG. 6B is an enlarged fragmentary sectional explanatory view showing another step in the bending working process, following the step of FIG. 6A.

When this preliminary bending working has been completed, preliminary bending blade 13 is immediately withdrawn to a position generally corresponding to the preliminary bending standby position Q1. Then, main bending blade 12 moves toward and approaches die 7 in place of preliminary bending blade 13, so as to bend the claw piece G to the main bending position in cooperation with die 7 as shown in FIG. 6B thereby forming loose-fit hemming joint section 1 having a generally C-shaped cross-section. With this loose-fit hemming joint section 1, the floor panel F is put between the main body of the body side panel B and the claw piece G forming part of body side panel B. At this time, as shown in FIGS. 4 and 5, the tip end of adjusting bolt 21 is projected relative to the tip end face of main bending blade 12, and therefore a further bending for the claw piece G cannot be made when the tip end of adjusting bolt 21 is brought into contact with the claw piece(G)-side surface of the floor panel F, thus completing the bending working for the claw piece G. In other words, the bending amount of the claw piece G depends on the previously set distance between the tip end face of main bending blade 12 and the tip end of the adjusting bolt 21.

In this embodiment, assume that, for example, two floor panels F are put between the claw piece G and the main body of the body side panel B so that the clearance ensured in loose-fit hemming joint section 1 is C1 as shown in FIG. 7A. In this case, when one floor panel F is put between the claw piece G and the main body of the body side panel B so that the thickness of the floor panel F is smaller than that in FIG. 7A, main bending blade 12 forces the claw piece G toward the floor panel F until the adjusting bolt 21 is brought into contact with the claw piece(G)-side surface of the floor panel F as shown in FIG. 6B. As a result, the claw piece G is bent in such a manner that the tip end section of the claw piece approaches the floor panel F relative to the base section of the claw piece, thereby taking an inclined state as a whole. At this time, the clearance C2 secured between at least the tip end of the claw piece G and the claw piece(G)-side of the floor panel F is become equal to the clearance C1 in FIG. 7A so as to establish the relationship of C1=C2.

In other words, by previously mechanically setting the value of the above-mentioned C1=C2 as the distance between the tip end face of the main bending blade 12 and the tip end of the adjusting bolt 21 in the bending apparatus, the clearance C1, C2 which has been previously set relative to the claw piece(G)-side surface (serving as a standard) of the floor panel F to be involved in loose-fit hemming joint section can be ensured when the claw piece G is bent to form loose-fit hemming joint section 1 as shown in FIGS. 6A and 6B and FIGS. 7A and 7B. Accordingly, the above-mentioned clearances C, C2 become C1=C2 regardless of the magnitude of the thickness of the floor panel F to be involved in loose-fit hemming joint section 1, so that the relative freedom between the panels B and F based on the clearances C1, C2 always becomes constant.

The above-discussed bending working is carried out on the front pillar P shown in FIG. 13 in a similar manner by using common bending apparatus 2.

As discussed above, bending working is successively carried out on plural claw pieces G of the left-side and right-side body side panels B, thereby accomplishing the preliminary assembly of the floor panel F and the left-side and right-side body side panels B. The panels F and B in their preliminary assembly state are transferred as they are to the next process or provisional spot-welding process through certain transferring means.

In the provisional spot-welding process, the final relative positioning is carried out between the body side panel B and the floor panel F which are in the preliminary assembly state, by using, for example, a manipulator of the rectangular coordinates-type or a multi-axis locator jig constituting a robot. At this time, the above-mentioned clearance C1, C2 ensured in loose-fit hemming joint section 1 effectively functions to absorb a delicate three-dimensional locational error formed between the body side panel B and the floor panel F.

Figure 8:
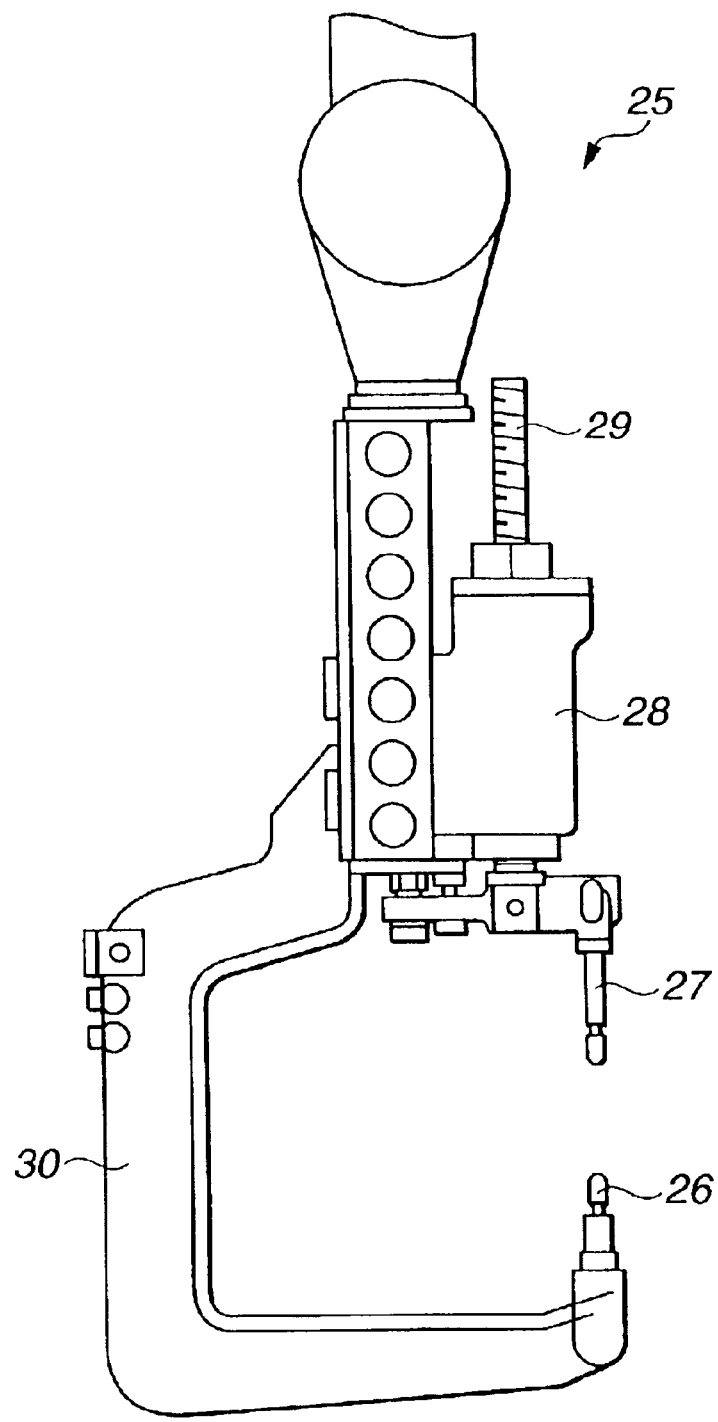
FIG. 8 is a fragmentary schematic side view of a servo-type spot welding gun used in an assembly method according to the present invention.

Thus, the final relative location between the body side panel B and the floor panel F has been completed, a welding robot standing by ready to operate in the provisional spot-welding process starts to operate so as to make spot welding at certain numbers of positions in a joint section between the panels B and F. For this spot welding, for example, spot welding gun 25 of the servo type as shown in FIG. 8 is used.

This servo-type spot welding gun 25 includes servo motor 28 and ball screw 29 in combination, serving as pressing and driving means for electrode tips 26, 27. When servo motor 28 starts to operate, electrode tip 27 linearly moves forward and rearward relative to electrode tip 26 thereby accomplishing the pressing action thereof. Additionally, spot welding gun 25 has such a function as to automatically compensate the deflection amount of gun arm 30 in accordance with the previously set relationship between the pressing force of electrode tip 27 and the deflection amount of gun arm 30, since gun arm 30 unavoidably makes its deflection with application of the pressing force. Such servo-type spot welding gun 25 is disclosed, for example, in Japanese Patent Provisional Publication No. 6-31462.

When the spot welding at the certain numbers of positions has been completed, the relative precision location between the body side panel B and the floor panel F is accomplished thereby losing the function of the above-discussed loose-fit hemming joint section 1. This loose-fit hemming joint section 1 partly bulges outward in a welded joint section between the body side panel B and the floor panel F, and therefore there is a possibility that the loose-fit hemming joint section makes a trouble during installation operation of interior parts and the like in a succeeding process if the loose-fit hemming joint section is left as it is. Accordingly, it is preferable to depress loose-fit hemming joint section 1 so as to lose the clearance (shown in FIGS. 7A and 7B) ensured in each loose-fit hemming joint section 1 thereby changing the loose-fit hemming joint section into the hemming joint section of the normal mode.

Figure 9A:
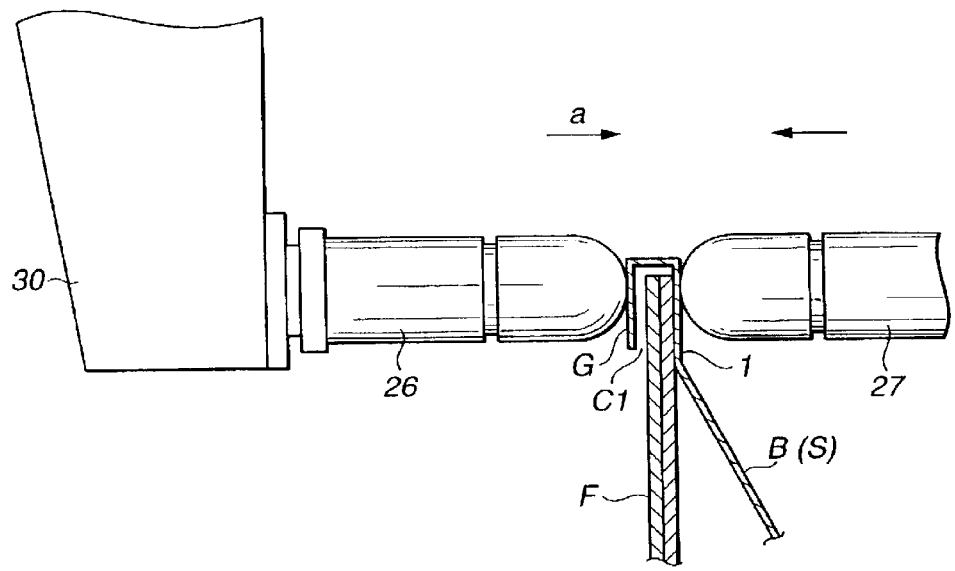
FIG. 9A is an enlarged fragmentary sectional view showing a state of a crashing working made to the loose-fit hemming joint section by using the spot welding gun.

In this regard, when the welding by spot welding gun 25 has been completed, each loose-fit hemming joint section 1 is depressed by employing the pressing function of spot welding gun 25 provided with a deflection amount automatic compensation function. More specifically, first electrode tip 26 on gun arm 30 makes its approaching action to and comes into contact with loose-fit hemming joint section 1 from the inboard side or the side of a passenger compartment as shown in FIG. 9A. Subsequently, electrode tip 27 at the pressing side is forwarded by servo motor 28 and is brought into contact with loose-fit hemming joint section 1. In this state where loose-fit hemming joint section 1 is put between both electrode tips 26 and 27, a preset current for pressing is passed or supplied through servo motor 28 thereby making a pressing action of electrode tip 27.

Figure 9B:
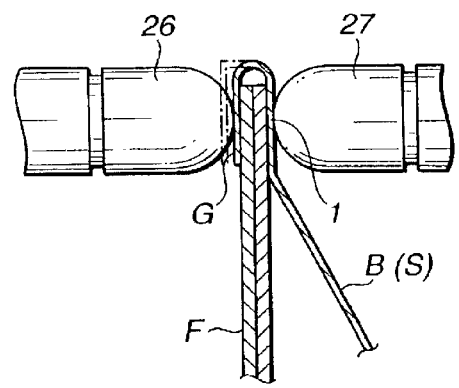
FIG. 9B is an enlarged fragmentary sectional view showing another state of the crashing working made to loose-fit hemming joint section by using the spot welding gun.

During this pressing action, under the deflection amount compensation function in accordance with the current (corresponding to a set pressure) for pressing, a compensation is made in an amount of [a+C1] where a is the deflection amount of gun arm 30 of spot welding gun 25; and C1 is the dimension of the clearance in loose-fit hemming joint section 1. This compensation amount has been previously taught to a control system for the robot having spot welding gun 25 in addition to locational data and the like of each loose-fit hemming joint section 1. As a result, the robot having spot welding gun 25 is operated in such a manner that electrode tip 26 is moved in a direction of an arrow a in FIG. 9 upon taking account of the compensation amount of [a+C1] under the condition in which loose-fit hemming joint section 1 is put between electrodes tips 26, 27, and loose-fit hemming joint section 1 is depressed and crushed merely under the pressing action and with no current supply like during the spot welding so as to lose the clearance (for example, the clearance C1) in loose-fit hemming joint section 1, as shown in FIG. 9B. The pressing action is made at two or three positions in each loose-fit hemming joint section 1.

With the thus accomplished depression, each loose-fit depression whose inherent function has been lost can be securely depressed without causing bending apparatus 2 to be provided with any special device. Particularly during crushing of loose-fit hemming joint section 1 under the pressing action of the above-mentioned spot welding gun 25, the pressing force is prevented from becoming excessive or deficient by using the above-mentioned deflection amount automatic compensation function, and therefore loose-fit hemming joint section 1 can be securely crushed to come into the shape of normal hemming joint section 1 without causing the floor panel F to be bent or distorted. Accordingly, no problem will be raised in the succeeding process in which the trimming parts and the like are assembled to hemming joint section 1.

Figure 10:
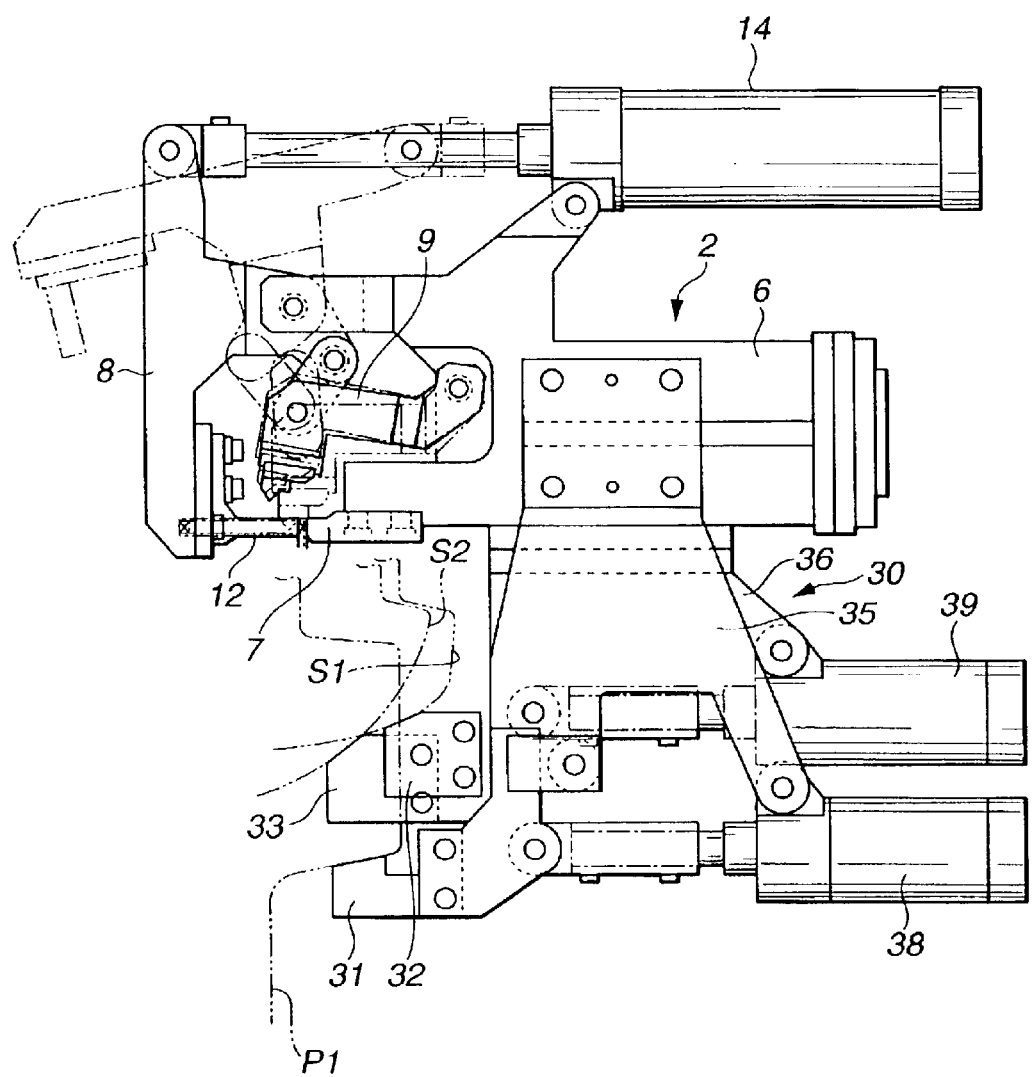
FIG. 10 is a fragmentary front view of another embodiment of the preliminary assembly system according to the present invention provided with a backup device, serving as the bending apparatus.
Figure 11:
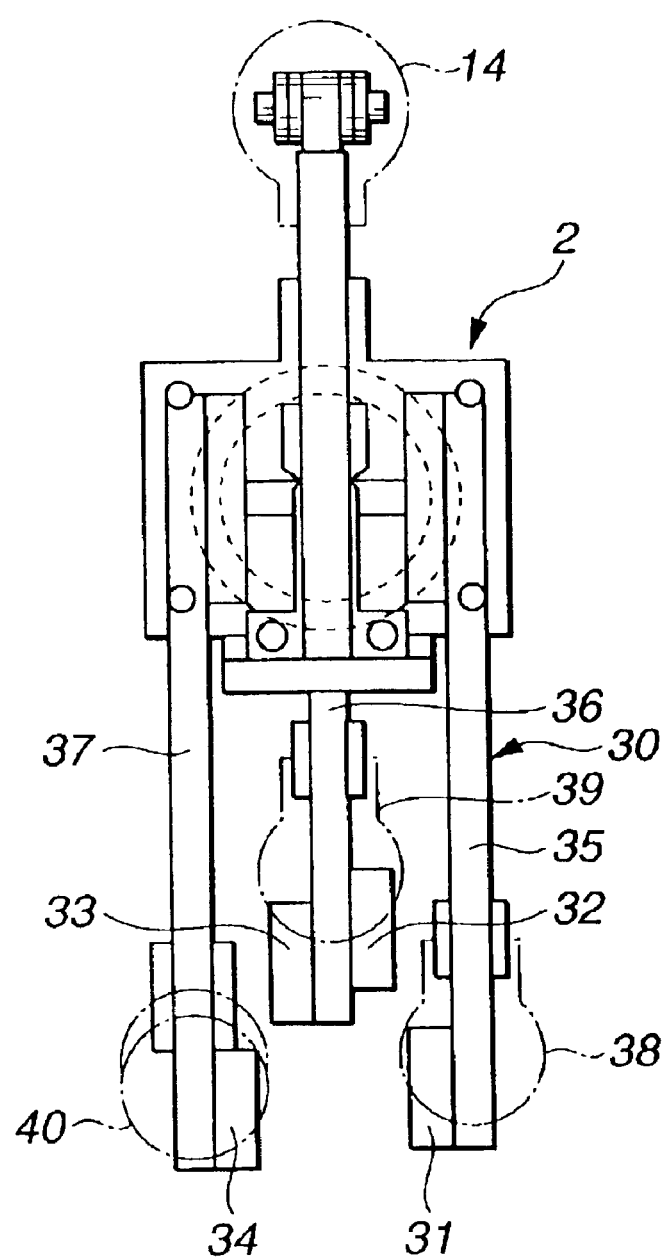
FIG. 11 is a left side view of the preliminary assembly system of FIG. 10.
Figure 12:
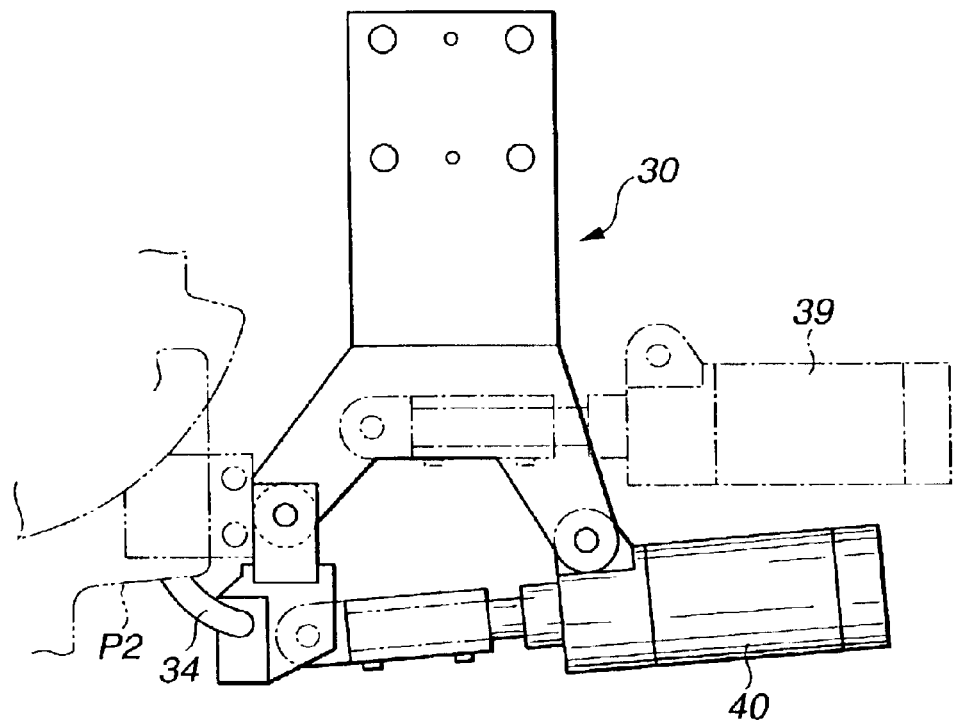
FIG. 12 is a fragmentary front view of the preliminary assembly system of FIG. 11.

FIGS. 10 to 12 illustrate another embodiment of the preliminary assembly system according to the present invention, similar to the embodiment of FIGS. 1 to 9B with the exception that the bending apparatus 2 is provided with a backup device 30.

In the arrangement shown in FIGS. 2 and 6, when loose-fit hemming joint section 1 is formed by bending the claw piece G by bending apparatus 2, for example, the body side panel B may escape from its position under the action of a working reaction thereby causing excess and deficiency in bending state of the claw piece G.

In view of the above, backup device 30 provided with a plurality of backup blocks 31, 32, 33, 34 are additionally installed to bending apparatus 2. Any of the backup blocks is selected according to kind of vehicle and location of the vehicle to backup or support the side sill outer of the side sill S and the front pillar outer of the front pillar P of the body side panel B thereby suppressing the release of the body side panel B caused with the bending working applied to the claw piece G.

More specifically, backup device 30 includes a plurality of brackets 35, 36, 37 which are fixed to base frame 6 of bending apparatus 2. Single or plural backup blocks 31, 32, 33, 34 of the swingable type are installed together with drive cylinder (hydraulic cylinder) 38, 39, 40 to each bracket 35, 36, 37. Backup block 31 makes its swinging movement with the extension or contraction action of drive cylinder 38 thereby backing up or supporting, for example, the front pillar outer P1 as shown in FIG. 10. Backup blocks 32, 33 make their swinging action with the extension or contraction action of common drive cylinder 39 thereby backing up or supporting, for example, the side sill outers S1 and S2 which are different in location or kinds of vehicle, as shown in FIG. 10. It will be understood that both backup blocks 32, 33 cannot be simultaneously used.

Backup roller 34 makes its swinging movement upon extension or contraction action of drive cylinder 40 thereby backing up or supporting front pillar outer P2 as shown in FIG. 12.

Thus, by operating backup device 30 during the bending working for the claw piece G by the above bending apparatus 2, the escape of the body side panel B can be effectively suppressed thereby further improving the bending working quality for the claw piece G and the forming quality for loose-fit hemming joint section 1.

As appreciated from the above, according to the present invention, even though there is a difference in thickness of the panel to be held in the loose-fit hemming joint section according to kind or location of the vehicle, a constant clearance can be ensured in the loose-fit hemming joint section and therefore a constant freedom can be ensured under the effect of the constant clearance by using only one apparatus. Accordingly, the preliminary assembly state of the vehicle body component parts can be stabilized during transportation, while establishing a well-balanced preliminary assembly state as a whole. As a result, in case that the final relative location is made between the panels in the preliminary assembly state by using the locator jig or the like, the relative location can be smoothly and accurately achieved.

The entire contents of Japanese Patent Application P2001-290569 (filed Sep. 25, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A preliminary assembly system for joining a body side panel and a floor panel as component parts of a body of an automotive vehicle in a loose-fit hemming joint state by bending a claw piece extending from a main body of one of the panels to hold the other of the panels so that the panels are joined to each other in a condition having a freedom in relative location between the panels, prior to joining of the panels under welding, said preliminary assembly system comprising:

a die which is to be in contact with a back-side surface of the main body of one of the panels in a region forming a loose-fit hemming joint section, the back-side surface being opposite to a front-side surface of the main body facing the other of the panels; and a main bending blade which is movable to approach the die to bend the claw piece of the one of the panels until the loose-fit hemming joint state is established; wherein the preliminary assembly system is adapted to move the main bending blade to approach the die by a movement amount which is mechanically determined relative to a first surface of the other of the panels during formation of the loose-fit hemming joint section when the other of the panels is located between the main body and the claw piece of the one of the panels and the first surface is facing the claw piece in a bent state.

2. A preliminary assembly system as claimed in claim 1, further comprising an adjustable stopper adapted to restrict the movement amount of the main bending blade approaching the die upon coming into contact with the first surface of the other of the panel, the adjustable stopper being adjustable to change the movement of the main bending blade so as to control the movement amount.

3. A preliminary assembly system as claimed in claim 2, wherein said adjustable stopper includes a stopper member extending parallel with the main bending blade from a common base member from which the main bending blade extends, the stopper member having a tip end which axially projects toward the die relative to a tip end of the main bending blade, and an adjusting mechanism for changing position of the tip end of the stopper member relative to the tip end of the main bending blade so as to adjust the movement amount of the main bending blade.

4. A preliminary assembly system as claimed in claim 1, wherein the preliminary assembly is further adapted to:

consecutively bend a first claw piece extending from a first main body to hold a first other panel and a second claw piece extending from a second main body to hold a second other panel, one at a time by moving the main bending blade to approach the die by a movement amount which will bend the second claw piece extending from the second main body such that a gap representing the shortest distance between the first surface of the second other panel and an inside surface of the second claw piece facing the first surface of the second panel is the same as a gap representing the shortest distance between the first surface of the first other panel and an inside surface of the first claw piece facing the first surface of the first panel when a thickness of the first other panel is different than the thickness of the second other panel.

5. An assembly method for vehicle body component parts, comprising:

preliminarily assembling a body side panel and a floor panel as component parts of an automotive vehicle body in a loose-fit hemming joint state by bending a claw piece extending from a main body of one of the panels to hold the other of the panels so that the panels are joined to each other to form a loose-fit hemming joint section having a freedom in relative location between the panels;

welding the body side panel and the floor panel by using a servo-type spot welding gun upon accomplishing a relative location between the body side panel and the floor panel which have been preliminarily assembled; and crushing the loose-fit hemming joint section by using the servo-type spot welding gun.

6. An assembly method as claimed in claim 5, wherein the crushing the loose-fit hemming joint section includes putting the loose-fit hemming joint section between first and second electrode tips of the servo-type spot welding gun in a manner that the first and second electrode tips are respectively in contact with the claw piece and the main body of the one of the panels, and pressing the loose-fit hemming joint section by the first and second electrode tips.

7. An assembly method as claimed in claim 6, wherein the servo-type spot welding gun has is adapted to compensate a pressing amount for crushing the loose-fit hemming joint section by a compensate amount which is a sum of a deflection amount of a gun arm of the servo-type spot welding gun and a dimension of a clearance between the claw piece and the other of the panels in the loose-fit hemming joint section.

8. An assembly method for vehicle body component parts, comprising:

preliminarily assembling a body side panel and a floor panel as component parts of an automotive vehicle body in a loose-fit hemming joint state by bending a claw piece extending from a main body of one of the panels to hold the other of the panels so that the panels are joined to each other in a condition having a freedom in relative location between the panels, by using a preliminary assembly system including a die which is to be in contact with a back-side surface of the main body of one of the panels in a region forming a loose-fit hemming joint section, the back-side surface being opposite to a front-side surface of the main body facing the other of the panels, and a main bending blade which is movable to approach the die to bend the claw piece of the one of the panels until the loose-fit hemming joint state is established, wherein the main bending blade is moved to approach the die by a movement amount which is mechanically determined relative to a first surface of the other of the panels during formation of the loose-fit hemming joint section, the other of the panels being put between the main body and the claw piece of the one of the panels, the first surface facing the claw piece in a bent state;

welding the body side panel and the floor panel by using a servo-type spot welding gun upon accomplishing a relative location between the body side panel and the floor panel which have been preliminarily assembled; and crushing the loose-fit hemming joint section by using the servo-type spot welding gun.

* * * * *